US011595339B2

(12) United States Patent
Tal et al.

(10) Patent No.: US 11,595,339 B2
(45) Date of Patent: Feb. 28, 2023

(54) SYSTEM AND METHOD OF EMBEDDING RICH MEDIA INTO TEXT MESSAGES

(71) Applicant: Google LLC, Mountain View, CA (US)

(72) Inventors: Iddo Tal, Palo Alto, CA (US); Lior Gonnen, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/721,586

(22) Filed: Dec. 19, 2019

(65) Prior Publication Data

US 2020/0145360 A1     May 7, 2020

Related U.S. Application Data

(63) Continuation of application No. 15/955,572, filed on Apr. 17, 2018, now Pat. No. 11,063,894, which is a continuation of application No. 14/079,957, filed on Nov. 14, 2013, now Pat. No. 9,948,589.

(60) Provisional application No. 61/726,145, filed on Nov. 14, 2012.

(51) Int. Cl.
*H04L 51/18* (2022.01)
*H04L 51/10* (2022.01)

(52) U.S. Cl.
CPC .............. *H04L 51/18* (2013.01); *H04L 51/10* (2013.01)

(58) Field of Classification Search
CPC ................................ H04L 51/10; H04L 51/18
See application file for complete search history.

(56) References Cited

U.S. PATENT DOCUMENTS

| | | | |
|---|---|---|---|
| 6,754,647 B1 | 6/2004 | Tackett et al. | |
| 7,865,394 B1* | 1/2011 | Calloway | G06Q 10/107 705/14.4 |
| 7,962,942 B1 | 6/2011 | Craner | |
| 7,996,775 B2 | 8/2011 | Cole et al. | |
| 8,166,026 B1 | 4/2012 | Sadler | |
| 8,402,387 B1 | 3/2013 | Iversen | |
| 8,775,526 B2 | 7/2014 | Lorch et al. | |
| 9,275,125 B1 | 3/2016 | Mungur et al. | |

(Continued)

FOREIGN PATENT DOCUMENTS

| | | |
|---|---|---|
| KR | 1020070044673 | 4/2007 |
| KR | 1020120111859 | 10/2012 |

OTHER PUBLICATIONS

USPTO, Non Final Office Action mailed for U.S. Appl. No. 14/079,957, dated Apr. 19, 2017, 14 pages.

(Continued)

*Primary Examiner* — Jennifer N Welch
*Assistant Examiner* — Ashley M Fortino
(74) *Attorney, Agent, or Firm* — IP Spring

(57) ABSTRACT

While texting, a user is able access, share, and control rich media without leaving the texting application. The rich media are provided directly within the executing texting application. The texting application includes an embedded widget for controlling the rich media. Rich media includes, among other things, video clips, streaming audio, a map application, a movie-time application, a social movie-site application, a dynamically controllable image, or promotional media. Different mobile devices executing the texting applications communicate through a server that allows additional functionality, such as syncing the play of video clips and hosting and pushing the promotional media.

20 Claims, 21 Drawing Sheets

(56) References Cited

U.S. PATENT DOCUMENTS

| | | |
|---|---|---|
| 9,306,880 B1 | 4/2016 | Hyndman et al. |
| 9,654,817 B2 | 5/2017 | Li et al. |
| 2003/0229722 A1 | 12/2003 | Beyda |
| 2005/0021624 A1 | 1/2005 | Herf et al. |
| 2005/0156947 A1 | 7/2005 | Sakai et al. |
| 2005/0204309 A1 | 9/2005 | Szeto |
| 2006/0015812 A1 | 1/2006 | Cunningham et al. |
| 2006/0085750 A1* | 4/2006 | Easton ............... G06F 9/453 715/708 |
| 2006/0200380 A1 | 9/2006 | Ho et al. |
| 2007/0033534 A1 | 2/2007 | Kim |
| 2007/0043687 A1 | 2/2007 | Bodart et al. |
| 2007/0110074 A1 | 5/2007 | Bradley et al. |
| 2007/0288560 A1 | 12/2007 | Bou-Ghannam et al. |
| 2008/0091692 A1 | 4/2008 | Keith et al. |
| 2008/0195699 A1 | 8/2008 | Min et al. |
| 2008/0307324 A1* | 12/2008 | Westen ............... H04N 7/15 715/753 |
| 2009/0006193 A1* | 1/2009 | Forbes ............ G06Q 30/0256 705/14.54 |
| 2009/0030800 A1 | 1/2009 | Grois |
| 2009/0063992 A1 | 3/2009 | Gandhi et al. |
| 2010/0076831 A1 | 3/2010 | Samuel |
| 2010/0123724 A1 | 5/2010 | Moore et al. |
| 2010/0162133 A1 | 6/2010 | Pascal et al. |
| 2010/0162138 A1 | 6/2010 | Pascal et al. |
| 2010/0279720 A1 | 11/2010 | Schultz |
| 2010/0279766 A1 | 11/2010 | Pliska et al. |
| 2010/0293473 A1 | 11/2010 | Borst et al. |
| 2011/0016000 A1 | 1/2011 | Cronshaw et al. |
| 2011/0055735 A1 | 3/2011 | Wood et al. |
| 2011/0086648 A1 | 4/2011 | Cho et al. |
| 2011/0264751 A1 | 10/2011 | Jans |
| 2011/0289428 A1 | 11/2011 | Yuen et al. |
| 2012/0021785 A1 | 1/2012 | Weinrib |
| 2012/0226544 A1* | 9/2012 | Merrifield ............ G06Q 50/01 705/14.27 |
| 2012/0290599 A1 | 11/2012 | Tian et al. |
| 2013/0024781 A1 | 1/2013 | Douillet et al. |
| 2013/0073556 A1 | 3/2013 | Valeski |
| 2013/0144961 A1* | 6/2013 | Park ............... H04L 67/325 709/206 |
| 2013/0159920 A1 | 6/2013 | Scott et al. |
| 2013/0263014 A1 | 10/2013 | Chalak |
| 2013/0318466 A1 | 11/2013 | Estrada et al. |
| 2014/0120961 A1 | 5/2014 | Buck |
| 2014/0136990 A1 | 5/2014 | Gonnen et al. |
| 2014/0195605 A1 | 7/2014 | Kallayil |
| 2015/0127453 A1 | 5/2015 | Tew et al. |
| 2016/0248778 A1* | 8/2016 | Erdal ............... G06Q 50/01 |

OTHER PUBLICATIONS

USPTO, Notice of Allowance mailed for U.S. Appl. No. 14/079,957, dated Feb. 27, 2018, 14 pages.

USPTO, Non-Final Office Action mailed for U.S. Appl. No. 15/955,572, dated Jul. 5, 2019, 17 pages.

USPTO, Non Final Office Action mailed for U.S. Appl. No. 14/079,957, dated May 25, 2016, 11 pages.

USPTO, Final Office Action mailed for U.S. Appl. No. 14/079,957, dated Oct. 31, 2016, 16 pages.

WIPO, International Search Report and Written Opinion mailed for international application No. PCT/US2013/070194, dated Feb. 27, 2014, 11 pages.

WIPO, International Preliminary Report on Patentability mailed for international application No. PCT/US2013/070194, dated May 19, 2015, 9 Pages.

USPTO, Final Office Action for U.S. Appl. No. 15/955,572, dated Mar. 9, 2020, 20 pages.

USPTO, Non-final Office Action for U.S. Appl. No. 15/955,572, dated Sep. 21, 2020, 15 pages.

USPTO, First Action Interview, Pre-Interview Communication for U.S. Appl. No. 16/673,759, dated Oct. 6, 2020, 5 pages.

USPTO, First Action Interview, Pre-Interview Communication for U.S. Appl. No. 16/673,743, dated Oct. 7, 2020, 5 pages.

USPTO, Notice of Allowance for U.S. Appl. No. 15/955,572, dated Apr. 1, 2021, 13 pages.

USPTO, Notice of Allowance for U.S. Appl. No. 16/673,743, dated Mar. 1, 2021, 14 pages.

USPTO, Non-final Office Action for U.S. Appl. No. 16/673,759, dated Mar. 8, 2021, 13 pages.

USPTO, Final Office Action for U.S. Appl. No. 16/673,759, dated Sep. 17, 2021, 14 pages.

USPTO, Non-final Office Action for U.S. Appl. No. 16/673,759, dated Feb. 4, 2022, 14 pages.

USPTO, Final Office Action for U.S. Appl. No. 16/673,759, dated Jul. 28, 2022, 15 pages.

USPTO, Notice of Allowance for U.S. Appl. No. 16/673,759, dated Nov. 8, 2022, 5 pages.

\* cited by examiner

SYSTEM AND METHOD OF EMBEDDING RICH MEDIA INTO TEXT MESSAGES

CROSS REFERENCE TO RELATED APPLICATIONS

This application is a continuation of U.S. patent application Ser. No. 15/955,572, filed Apr. 17, 2018, which is a continuation of U.S. patent application Ser. No. 14/079,957, filed Nov. 14, 2013 (now U.S. Pat. No. 9,948,589), which claims the benefit of U.S. Provisional Application No. 61/726,145, filed Nov. 14, 2012, all of which are incorporated by reference herein in their entirety for all purposes.

BACKGROUND

Texting is a commonly used feature of electronic devices such as smartphones. Today's devices do not allow a user to easily or seamlessly access rich media or other interactive content while in the texting application. For example, when a user wishes to share rich media while texting, she must leave the texting application, navigate to the rich media, copy the link to the rich media, return to the texting application, paste the link into a text message, and send the message to a recipient. Given the number of steps involved, many users are less likely to share rich media. FIG. 1, for example, is a screen shot 100 of a chat session after a user has performed most of these steps, right before sending the message.

While the recipient is viewing the rich media, she cannot simultaneously exchange text messages with the sender. Instead, she must switch between the texting application and the media playing application, making it impossible to interact with the sender while both users are accessing the rich media. In short, the user is severely limited in the tasks she can perform while in the texting application.

SUMMARY

In accordance with invention, a user is able to view, listen to, or control rich media during an active chat session. For example, a user is able to share a YouTube® video while texting, thus allowing her to text about the video as she is watching it. She and a friend can sync their viewing so that they are simultaneously watching the same parts of the video while texting each other, thus enhancing their viewing experience. While texting, the friends can watch or share any type of rich media including, but not limited to, videos, photos, and maps or promotional content such as advertisements.

Also in accordance with the invention, within a chat session a user is able to activate media, such as by tapping an image to "bring it to life," and then expand it, share it, forward it, post it on Facebook®, or collapse it to minimize its screen footprint, all without leaving the chat session.

Users are also able to add features to a chat, such as by sharing coupons during a chat session, communicate with "virtual friends" to receive information about specialized topics from segregated databases, send and receive credit usable on the system hosting the chat session, automatically receive suggestions on topics related to the chat session, and customize interactive media, such as to provide interfaces to particular Web sites, activities that can all be performed during chat sessions.

In one aspect of the invention, interactive content is embedded into a texting application. A server hosting content is queried to determine information about the content, information such as a title of the content, its duration, a preview clip or image, or other relevant information. A widget comprising rich media for interactively displaying and controlling the information is then generated on the fly. The widget is then embedded into a texting application.

In one embodiment, multiple clients, and thus multiple texting applications, are coupled through a server. The server performs certain tasks such as syncing content on multiple devices, notifying a sender when a recipient is playing rich media, and pushing advertisements into a chat session, to name only a few such tasks. In one embodiment, user keystrokes or gestures are automatically converted into emoticons and embedded within the text message.

In one embodiment, a plurality of selectable panes are concurrently presented on a device. Each pane corresponds to a chat session and has a widget embedded therein during the corresponding chat session. In one embodiment, only one of the panes (chat sessions) is active at a time.

In a second aspect of the invention, a method of transmitting data to a first device includes receiving a request from a first device for rich media for embedding the rich media into a chat session executing on the first device and transmitting a packet containing the rich media to the first device. The first device is able to be any device, such as a handheld device, a mobile phone, a smartphone, a personal computer, a desktop computer, a laptop computer, a personal digital assistant, a tablet, an iPad®, a smart watch, or smart glasses.

In a third aspect of the invention, a method of organizing contacts includes associating a virtual friend with a category and coordinating a chat session between a user application executing on an electronic device and the virtual friend. In one embodiment, the method further includes querying a specialized database for returning information corresponding to the category. The category includes, for example, sports, travel, movies, literature, or current events. In one embodiment, the method also includes organizing the virtual friend within a list of virtual friends based on popularity or on sponsorship fees.

DETAILED DESCRIPTION

In accordance with the principles of the invention, from within texting (chat) sessions, users are able to share rich media such as pictures, contact cards, YouTube® videos, Google® maps, and Spotify® songs. This list is exemplary only and does not limit this invention to only these types of rich media. Users can seamlessly integrate and share pictures from the native Facebook® application, videos from the native YouTube® application, Web content from any browsing application, and any texting application from their smartphone. In one embodiment, the text application that supports the chat sessions includes an embedded widget.

As one example, the term "rich media" refers to objects that can be controlled by user inputs, such as a video clip that can be started and stopped; a photograph that can be expanded, collapsed, shaded, colored, forwarded, shared, posted to a social networking site, or otherwise manipulated; an interface for selecting and purchasing a product or service; or a map that can be navigated.

As one example, an "embedded widget" appears to the user as an application executed within another application such that both applications appear to be executing simultaneously. In accordance with one embodiment of the invention, however, an embedded widget is an application that allows rich media to be formatted and displayed on a device in a particular way. For example, when a user receives a URL to rich media, such as by copying and pasting or by sharing it from another application, a module contacts a server that hosts the rich media. The server is queried for relevant, context-specific information about the rich media. The information is then packaged, transmitted to the device, and then displayed within a texting application, such as described herein. For example, when the URL is to a YouTube® video clip (e.g., http://www.youtube.com/watch?v={videoId}), the YouTube® server is queried for relevant details of the video "videoId." The details can include the video name, a preview image, a description of the video, and the playing time, to name only a few such details. This information is received on the device and, in accordance with the invention, graphically displayed on the device by a widget that is generated on the fly. The widget displays the relevant information as well as any context-specific action bar.

Figure 1:
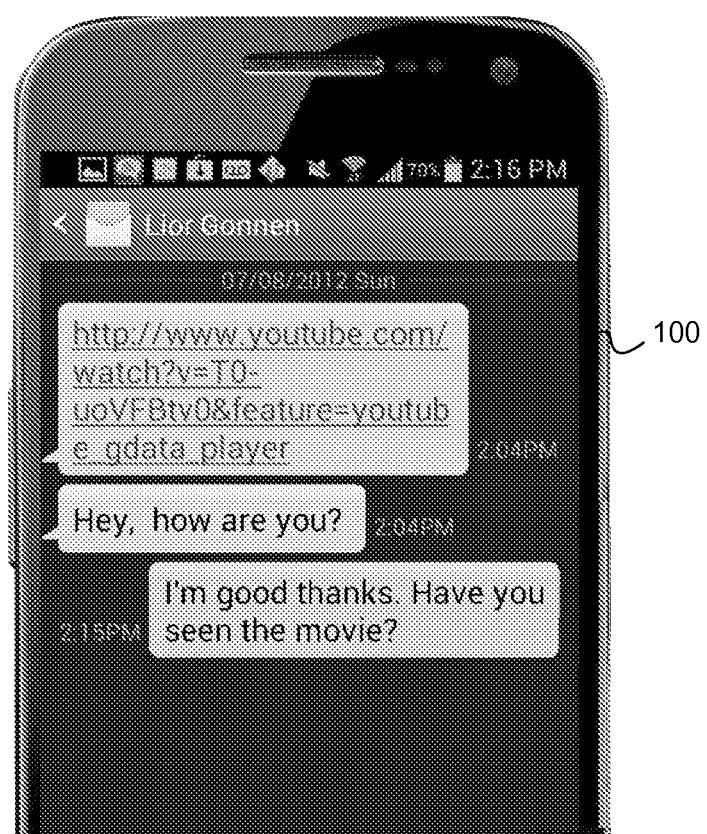
FIG. 1 is a screen shot of a prior art chat session containing a link to a YouTube® video.
Figures 2A, 2B, 2C:
FIGS. 2A-C are screen shots of text sessions with different embedded rich media in accordance with different embodiments of the invention.

FIG. 2A is a screen shot 200 of a chat session with text message areas 210A-C, rich media areas 205A-B, of which 205A contains an embedded video clip, and a text input box 215. Users are able to chat using the text message areas 210A-C while controlling the video clip 205A, such as by launching the video clip, pausing it, fast-forwarding it, rewinding it, or stopping it. The users are able to perform these tasks without exiting the chat session. While a user is viewing the video clip, she is able to enter a text message in the text input box 215 to comment on the video clip or to suggest a similar video or content, to name only a few such actions, without exiting from the chat sessions.

In one embodiment, the video clip is synced with the same video clip playing on a second user's mobile phone. Because the two users are watching the same portions of the video clip at the same time, they can comment on the same portions in real time.

A user can have different chat sessions going on simultaneously. For example, a user can be concurrently chatting with Bill and Alice. By tapping or otherwise selecting a text message area associated with Bill, the thread of all chat exchanges with Bill are activated. The user can scroll through all the messages and embedded rich media exchanged during the entire session with Bill. When that thread is activated, the user can continue chatting with Bill. In one embodiment, the thread with Bill is shown activated by having a bolder, richer color (e.g., 205A); the unactivated threads are shown as washed out (e.g., 205B). Those skilled in the art will recognize other ways to distinguish between activated and unactivated threads.

FIG. 2B is a screen shot 210 of a chat session with text message areas 220A-B, a rich media area 230 containing an interface to an "adopt-a-pet" interactive application, and a text input box 225. The adopt-a-pet interactive application includes a user-selectable button for adopting a pet. As in the screen shot of FIG. 2A, the user is presented with rich media during the chat session. In the example of FIG. 2B, the user is able to select and launch the adopt-a-pet interactive application at any time during the chat session.

FIG. 2C is a screen shot 250 of a chat session with a text input area 260 and rich media area 250A. The rich media area 250A includes a Google® map 250A and a keyboard 250B. While viewing the Google® map, the user is able to continue chatting with another user using the text input area 260. While chatting, the user is also able to control the rich media. For example, the user can change the Google® map, such as by zooming in to or out from particular portions of the map, navigate to different portions of the map, or track her current location on the map, to name a few different actions. While viewing the map, the user can use the chat session to communicate her location, arrival time, or other relevant information.

In accordance with one embodiment, the texting applications described herein all include an embedded widget that displays and controls the rich media. For example, in FIG. 2A, the embedded widget displays and receives user input to control the video clip.

Figure 3:
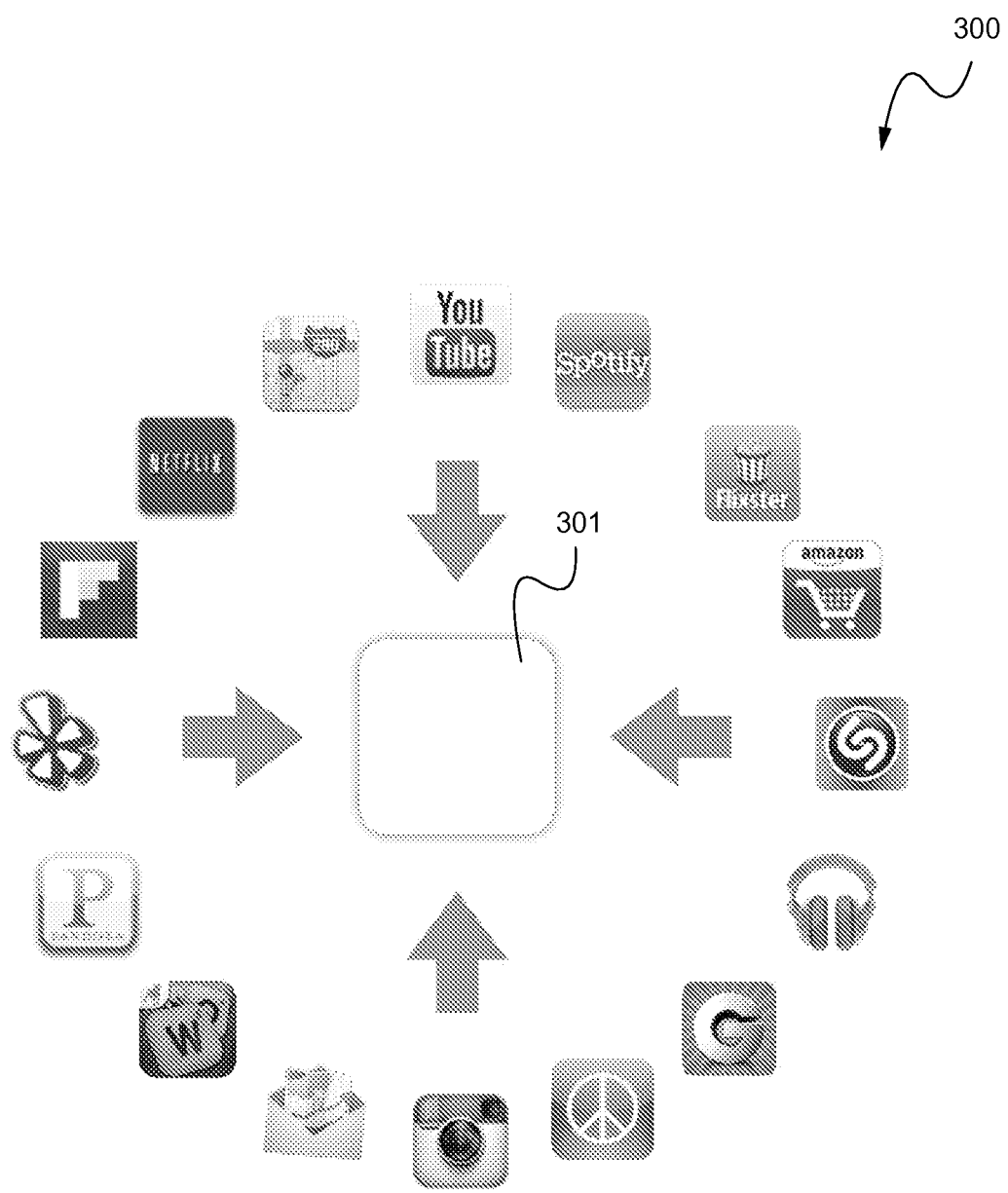
FIG. 3 is a graphical representation showing types of rich media that can be embedded within text messages in accordance with embodiments of the invention.

FIG. 3 is a schematic graphical representation 300 of some of the rich media that can be embedded in a chat session using, for example, a software application 301 in accordance with different embodiments of the invention. As shown in FIG. 3, the illustrative rich media include, but are not limited to, Pandora®, Amazon.com®, Flixster™, Spotify®, and YouTube®, to name only a few such examples.

Figure 4:
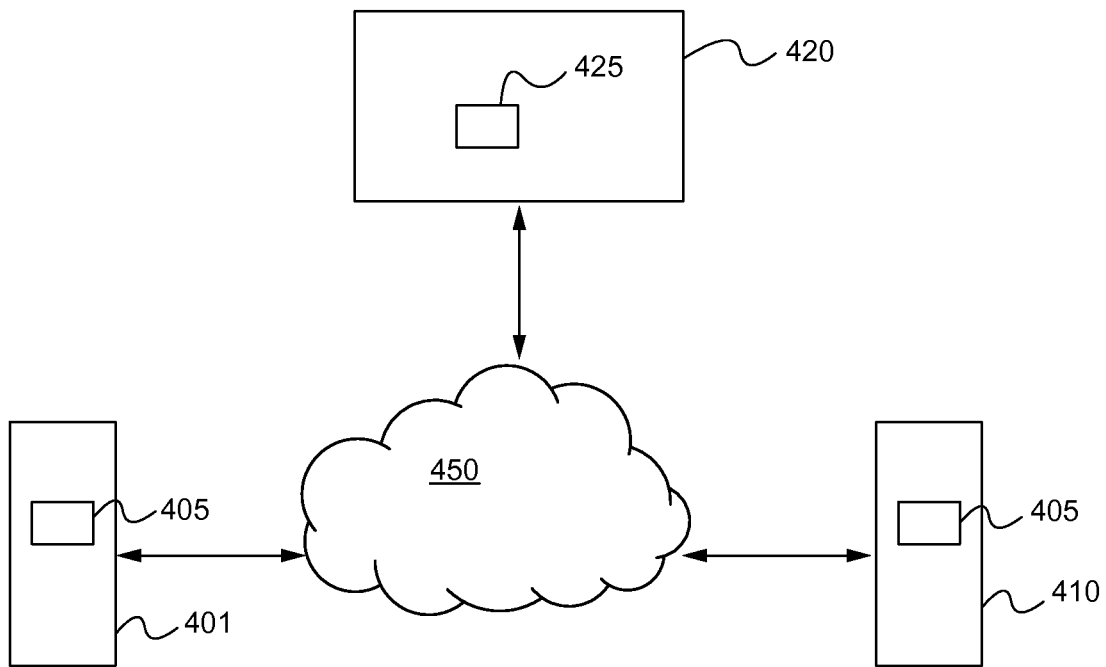
FIG. 4 shows two mobile phones coupled through a host in accordance with one embodiment of the invention.

In one embodiment, the components of a system in accordance with embodiments of the invention include a client application, which runs on a mobile device, and a host application, which runs on a server. FIG. 4 is a high-level diagram of two smartphones 401 and 410 coupled to each other through a server 420, over a network 450. The smartphones 401 and 410 each contains a copy of a client application 405, and the server 420 contains a host application 425. The client application 405 includes a texting application with an embedded widget for executing rich media for display and control within text messages. The network 450 can be any type of network, such as the Internet, a wireless network, a wide area network, a local area network, or any combination of these.

Those skilled in the art will recognize that, in one embodiment, the elements 401, 410, and 420 each includes computer-readable media containing computer-executable instructions for performing the algorithms described herein and a processor for executing those instructions.

Figure 5:
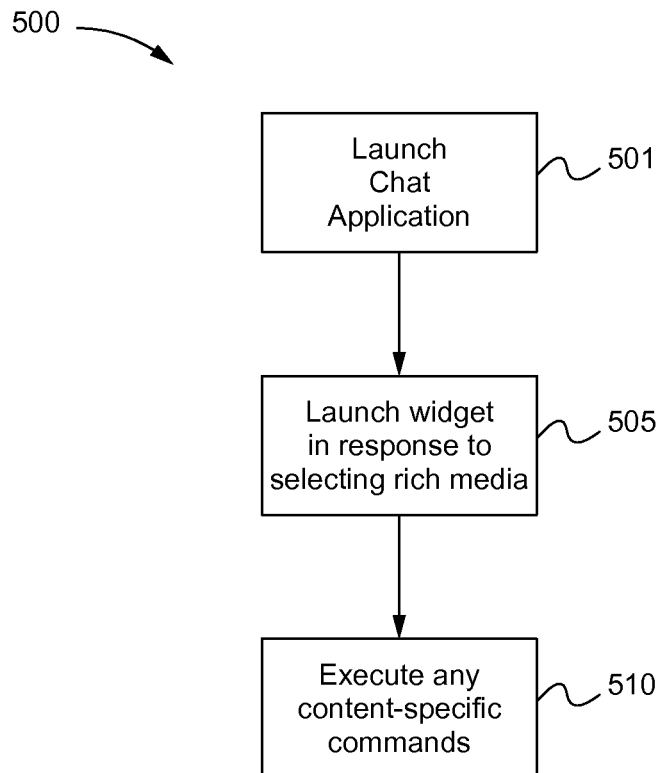
FIG. 5 is a flow chart of the steps for executing and controlling rich media embedded within a chat session in accordance with one embodiment of the invention.

FIG. 5 is a flowchart of the steps 500 of a method performed by a client application (e.g., element 405 in FIG. 4) in accordance with one embodiment of the invention. In the step 501, a chat application is launched on a mobile or other device such as a smartphone (e.g., 401 and 410), such as by selecting a particular chat session. In the step 505, when embedded rich media is selected, such as by activating a video clip, a corresponding interactive widget is launched. Preferably, the widget is embedded in the chat session so that the chat session and rich media are executing (or at least appear to the user to be executing) simultaneously. Some rich media accessed in accordance with the invention have context-specific commands. For example, if the rich media is a video clip (e.g., FIG. 2A), a play button is presented and, when selected, causes the video clip to play. If the rich media displays a user interface to a pet adoption site (e.g., FIG. 2B), a select button is presented which, when selected, executes an application that causes a pet to be adopted. In the step 510, any content-specific commands are executed.

The steps 500 are merely illustrative of one embodiment of the invention. It will be appreciated that in other embodiments, a method includes different steps from those shown in FIG. 5. In other embodiments, some steps are added, some of the steps are deleted, and the steps are performed in different orders.

As one example, a client in accordance with the invention (e.g., 405) includes the Android™ Gingerbread operating system (e.g., version 2.3 or above) and communicates with a server (e.g., 420) using Google® protocol buffers over HyperText Transfer Protocol (HTTP). The smartphones (e.g., 401 and 410) register with the server using Secure Sockets Layer (SSL), and transferred messages are signed with a secret token and Hash-Based Message Authentication Code (HMAC) authenticated. The server 420 of FIG. 4 is capable of performing many other tasks, such as syncing content on different smartphones, allowing users to simultaneously view the same content, etc.

In one embodiment, the server 420 comprises the Play! Framework, a Java and Scala framework. The server 420 is deployed to a set of amazon EC2 instances sitting behind a round-robin load balancer. The server 420 contains a shared MYSQL database, such as an Amazon Relational Database Service instance or, alternatively, a multi-AZ deployment. The server 420 uses a MemCached based cache cluster used separately or shared by multiple servers. The server 420 stores photos and rich media using an Amazon S3 server. The server 420 is REST based, completely stateless, and can easily scale horizontally. The server 420 is able to send push notifications to devices using the Google® Cloud Messaging (GCM) service and employs a message queue to generate Web-page thumbnails and smart-preview information. The server 420 sends registration Short Message Service (SMS) messages and is also able to host and push coupon, advertising, and other revenue-generating content to serve as rich media in accordance with the principles of the invention.

It will be appreciated that this list of features is illustrative only. In different embodiments, the server 420 performs a subset these features, additional features, or a combination of any of them.

Bringing Content to Life in a Chat

Figure 6:
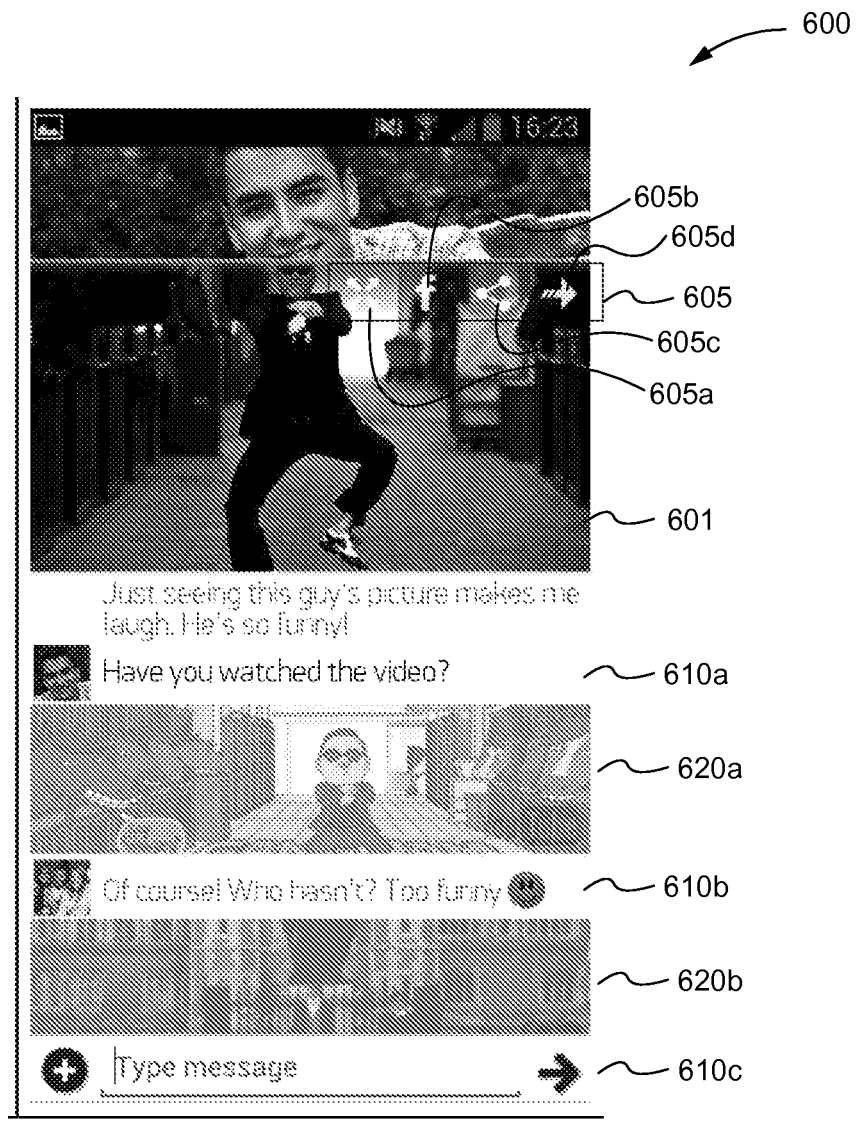
FIGS. 6-10 are screen shots of chat sessions each with different embedded rich media in accordance with different embodiments of the invention.

Now that the architecture of a system in accordance with one embodiment of the invention has been discussed, additional examples illustrating the principles of the invention are discussed. FIG. 6 is a screen shot 600 of a chat session with a widget that includes a dynamically controlled image 601 as rich media. During the chat session, a user is able to "bring the image to life," or activate it, by tapping it. The image 601 has an associated context-specific action bar 605 with buttons 605a, 605b, 605c, and 605d. When the image 601 is brought to life, the button 605a is able to be tapped to expand the image 601 to fill the entire screen and then later tapped to collapse the expanded image 601 so that portions of other rich media are able to be seen; the button 605b is able to be tapped to post the image 601 on Facebook®; the button 605c is able to be tapped to automatically share the image 601 with selected friends; and the button 605d is able to be tapped to forward the image 601 to selected friends. After tapping the button 605d, a list of the user's contacts (either in text, images, avatars, or other representations) is presented to the user, allowing him to select which contacts to forward the image to. The image 601 can also be tapped to put it to sleep, so that it is no longer active.

The screen shot 600 also shows text areas 610A-C and inactive rich media 620A-B, shown as "washed out" to indicate that they are inactive.

It will be appreciated that other types of rich media will have other action bars suited to the particular rich media. For example, in addition to the actions in the action bar 605, a video clip can have an action bar that also allows users to play, fast forward, or rewind the video clip. Rich media containing Yelp! content can contain a rating element that allows a user to rate a restaurant or other service. Rich media containing Flickster content can contain a button to play a movie trailer and to buy tickets to the movie. These are but a few examples of content-specific action bars that can be generated and used in accordance with the invention.

Converting Links and Other Kinds of Data to Widgets

Figure 7:
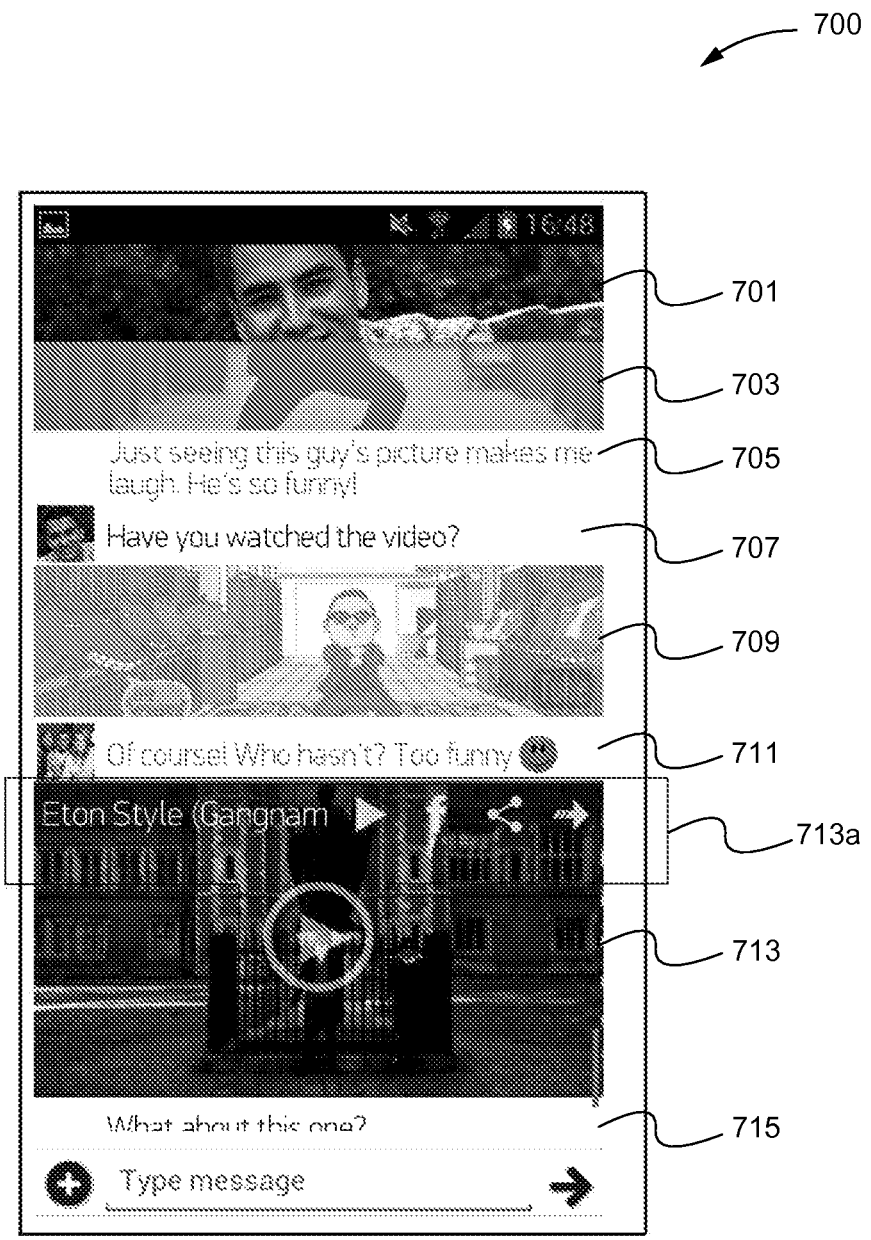
Figure 8:
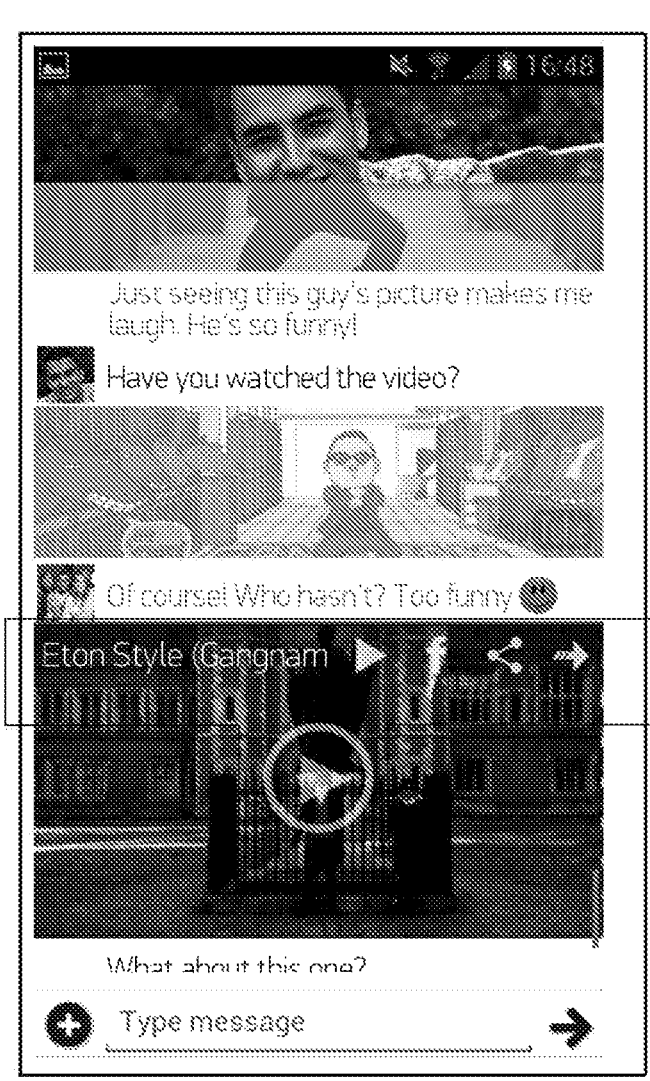

It will be appreciated that any kind of data shared from any application (e.g., html, text, link, picture) is able to be converted to an interactive widget right inside the chat. Furthermore, the interactive widgets display a context-sensitive action-bar with actions specific to the displayed content. FIGS. 7 and 8 are screen shots illustrating these features.

FIG. 7 is a screen shot 700 of text message areas 705 and 711 of an inactive thread, text message areas 707 and 715 of an active thread, rich media areas 703 and 709 of inactive threads, and rich media areas 701 and 713 of active threads.

In one embodiment, a user inputs a link to rich media into the text message area 715. After inputting the link (e.g., http://www.youtube.com/watch?v=nv9NwKAjmt0&feature=g-logo), the rich media is automatically embedded into a rich media area (e.g., 713). The context-specific action bar 713a is automatically embedded within the rich media. In this example, the context-specific action bar 713a includes a title of the rich media ("Eton Style (Gangnam")), a play button, a Facebook® button (f), a share button, and a forward button. Those skilled in the art will recognize other combinations of buttons that are able to be included in a context-specific action bar in accordance with the invention.

In one embodiment, referring to FIGS. 4 and 7, when the link is input into the text message area 715 and the user presses the Enter key, the server 420 retrieves the rich media, formats the rich media to include the context-specific action bar 713a, and returns the formatted rich media to the texting application 405 and the device 401, as shown in FIG. 7. FIG. 8 is a screen shot 800 of similar chat session.

Figure 9:
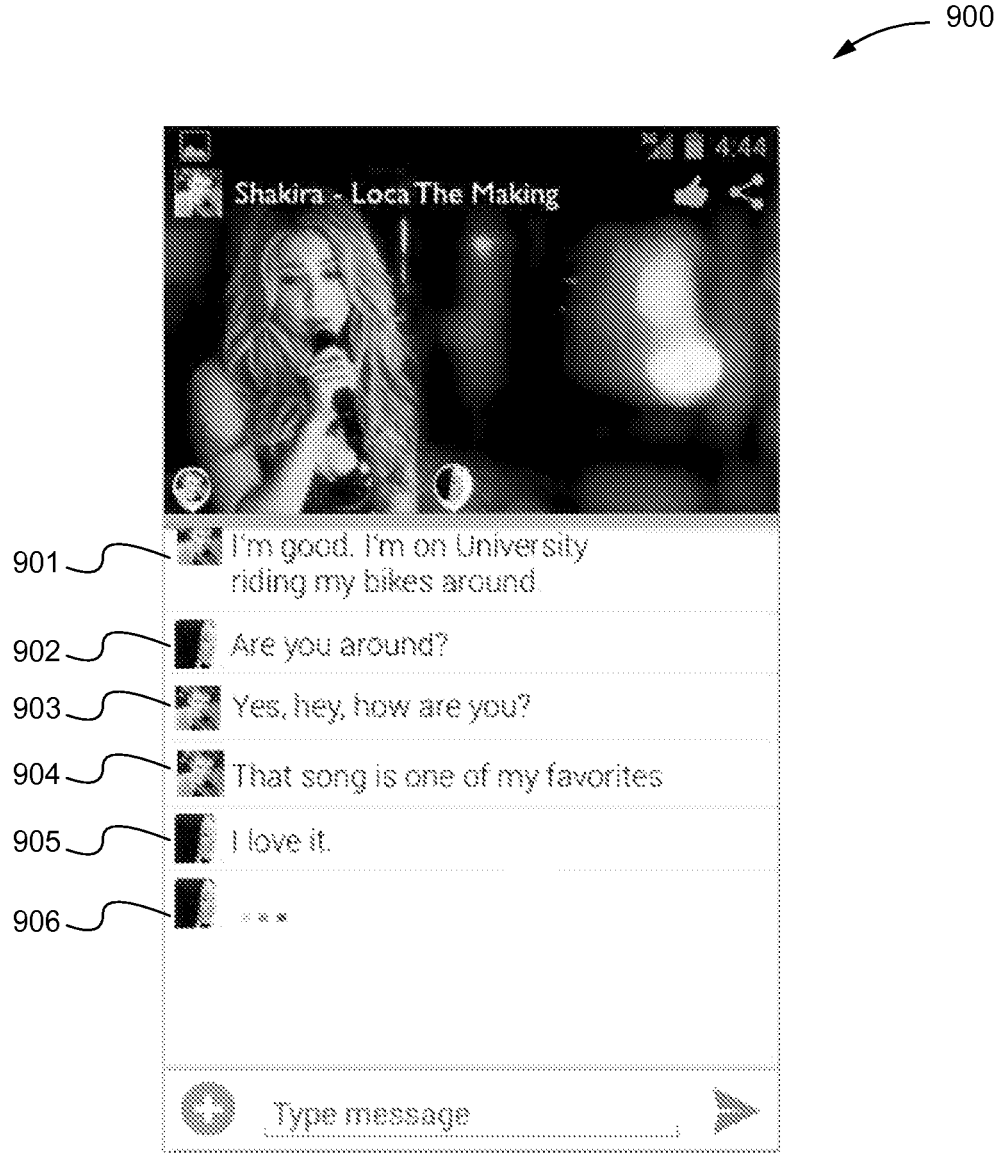

FIG. 9 is a screen shot 900 of a texting application in which the rich media includes a streaming video. The icons 901-906 represent friends with whom the user is chatting. By tapping one or more of the icons 901-906, the user is able to perform certain actions. For example, the user is able to receive a notification that a friend to whom he sent a video clip has received the video clip and that the friend is currently watching it. The user is able to see what location in the video his friend is currently watching (e.g., 1 minute and 20 seconds into the video). The user is also able to sync his and his corresponding friend's watching of the video. As the user is watching the video clip, he can send a "sync" command to a server (e.g., element 425 in FIG. 4) to trigger syncing his position in the video with his friend's position.

In some embodiments, for privacy, a user is able to prevent others from seeing that he is watching the rich media, from seeing his current location in the rich media, or from allowing another to sync to his location in the rich media. The user can do this, for example, by selecting a "privacy" button or some similarly functioning button (not shown).

Examples

Figure 10:
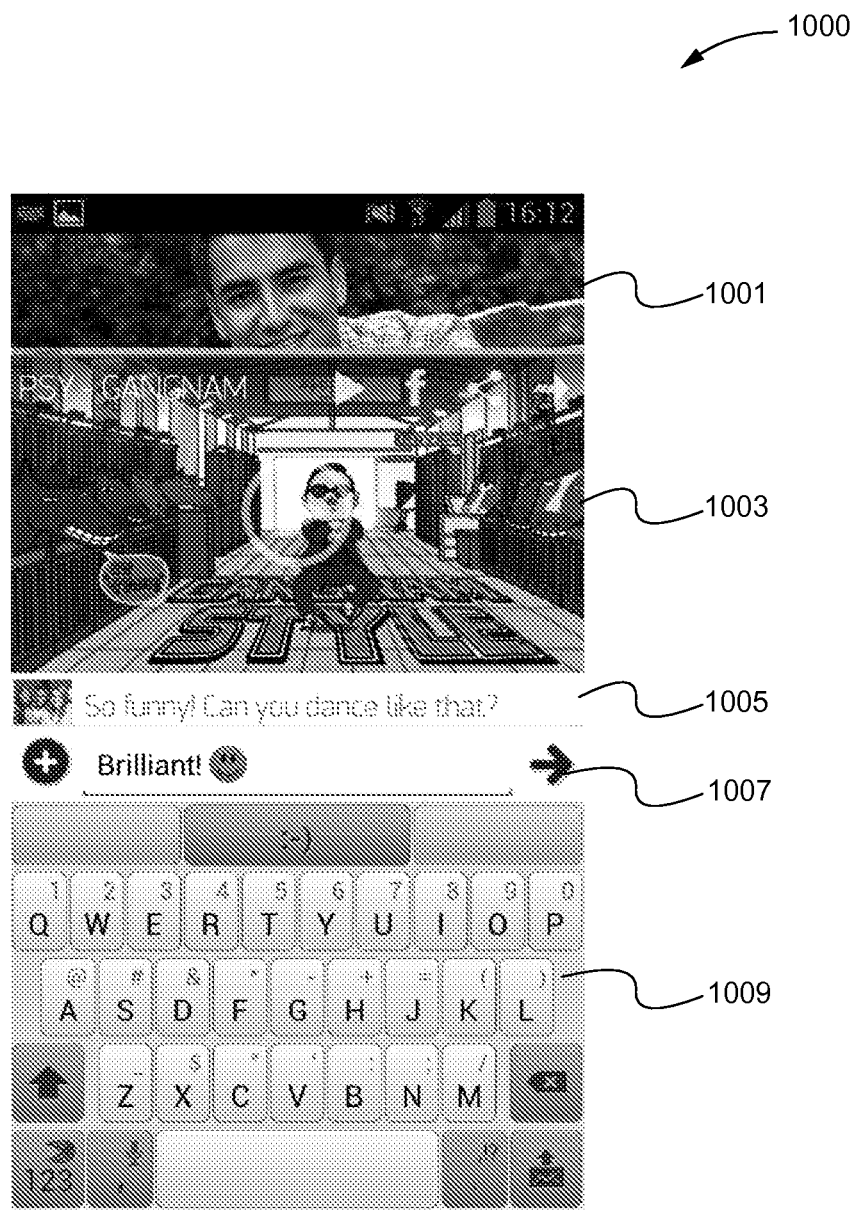

FIG. 10 is a screen shot 1000 of a texting application with an inactive text message area 1005, an active text message area 1007, and rich media areas 1001 and 1003 with a keyboard 1009 in accordance with one embodiment of the invention. The keyboard 1009 is configured to automatically convert keystroke combinations into emoticons and embed the emoticon into a text message. For example, pressing the ":" and ")" (colon and right parenthesis) keys, in that order, automatically inserts a smiley-face emoticon into the text message. Deleting the ")" key replaces the emoticon with the remaining character, a ":". As another example, pressing the ";" and ")" (semicolon and right parenthesis) keys, in that order, automatically inserts a blinking-face emoticon into the text message. Other key combinations can be used to insert different emoticons in accordance with embodiments of the invention.

Figure 11:
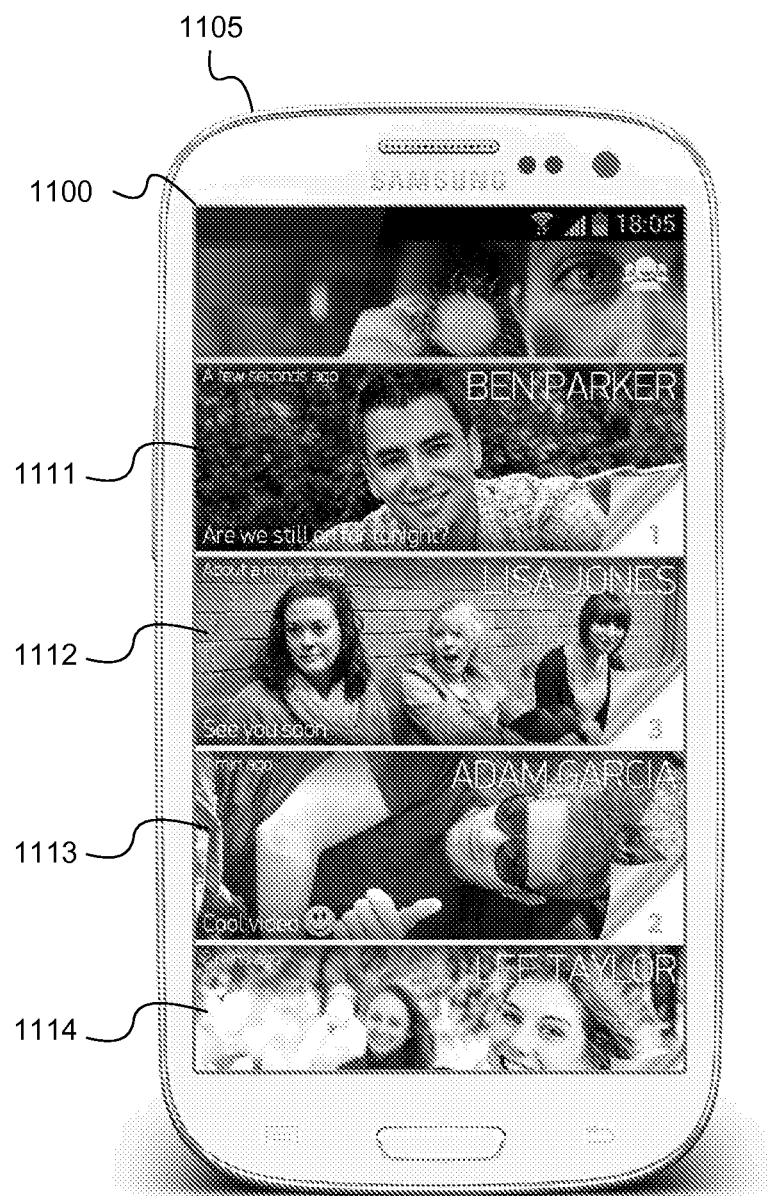
FIG. 11 is a screenshot of blocks showing multiple chat sessions in accordance with one embodiment of the invention.

FIGS. 11-16 show screenshots on devices in accordance with embodiments of the invention. FIG. 11 is a screenshot 1100 on a device 1105 showing blocks or panes 1111-1114. Each of the blocks 1111-1114 corresponds to a chat session between the user of the device 1105 and a different user. The blocks 1111-1114 are "stacked" one on top of another or "cascaded." Each of the blocks 111-1114 includes, among other things, the name of the different user, the last text message exchanged between the user of the device 1105 and the different user, and the time the text message was sent. When one of the blocks 1111-1114 is selected, the entire thread of the chat session between the corresponding users is displayed.

Figure 12:
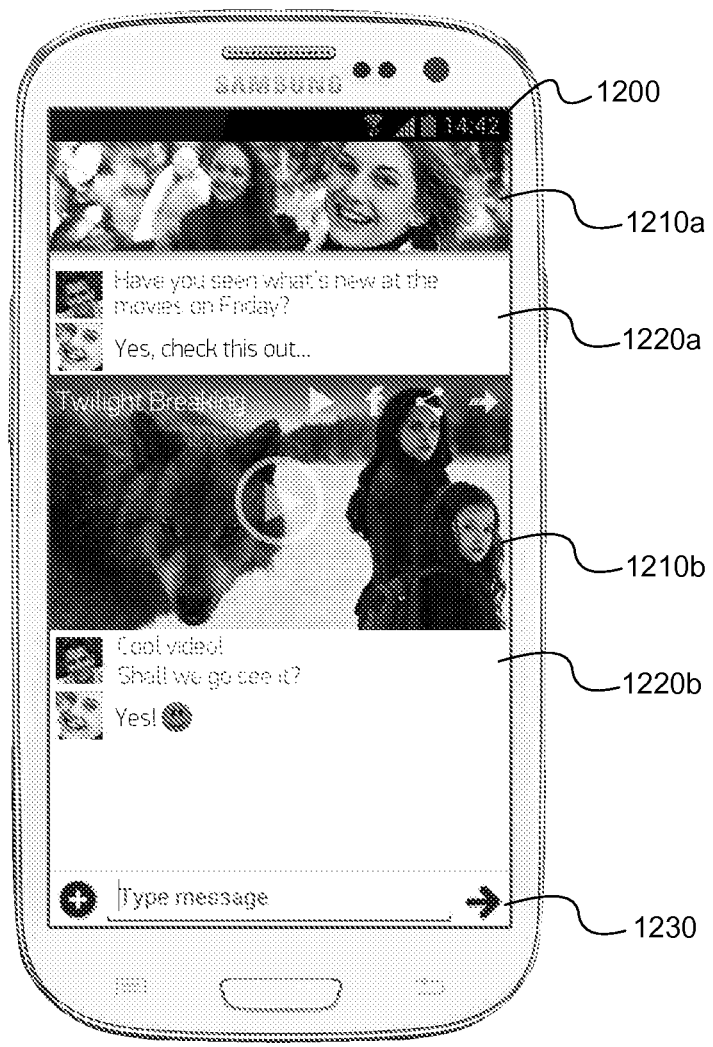
FIGS. 12-16 are screen shots of chat sessions each with different embedded rich media in accordance with different embodiments of the invention.
Figure 13:
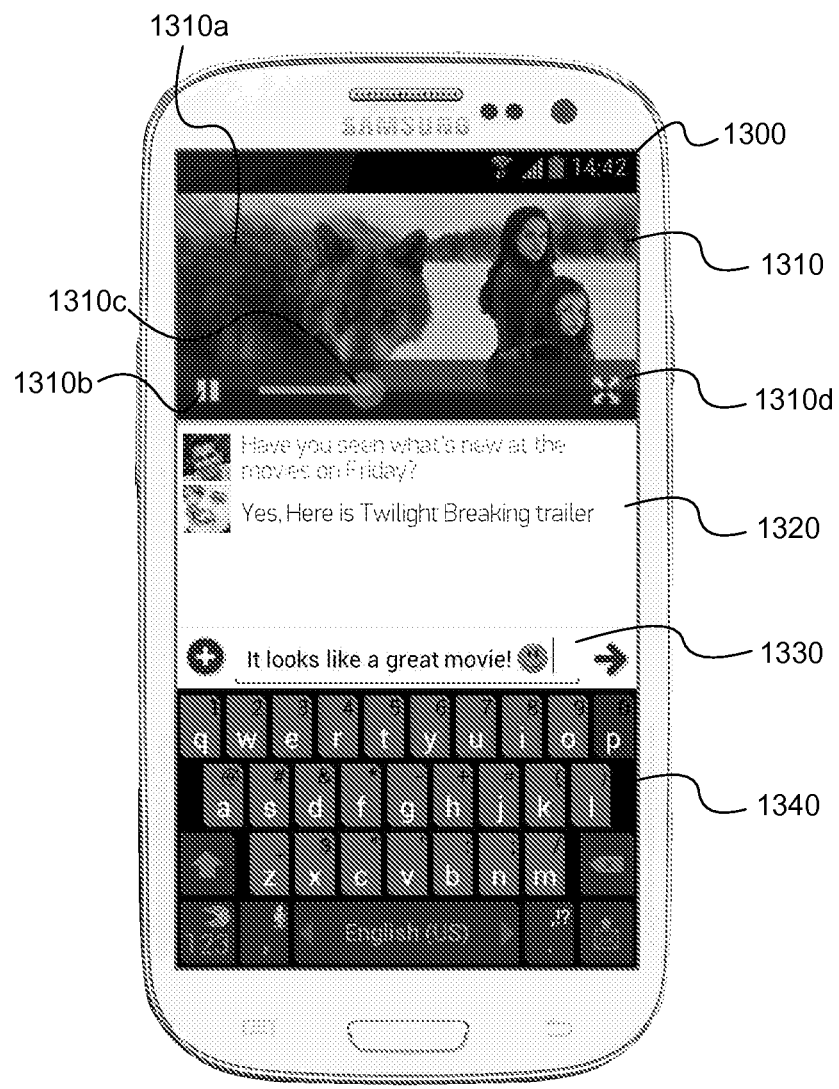

FIG. 12 is a screenshot 1200 showing rich media 1210A-B, text message areas 1220A-B, and a text input box 1230. FIG. 13 is a screenshot 1300 showing interactive rich media 1310 and 1340, a text message area 1320, and a text input area 1330. The area 1310 includes a display area 1310A showing a video, a pause button 1310B, a slider 1310C for seeking at a random location within the video, and a share button 1310D. The area 1340 contains a keyboard.

Figure 14:
Figure 15:
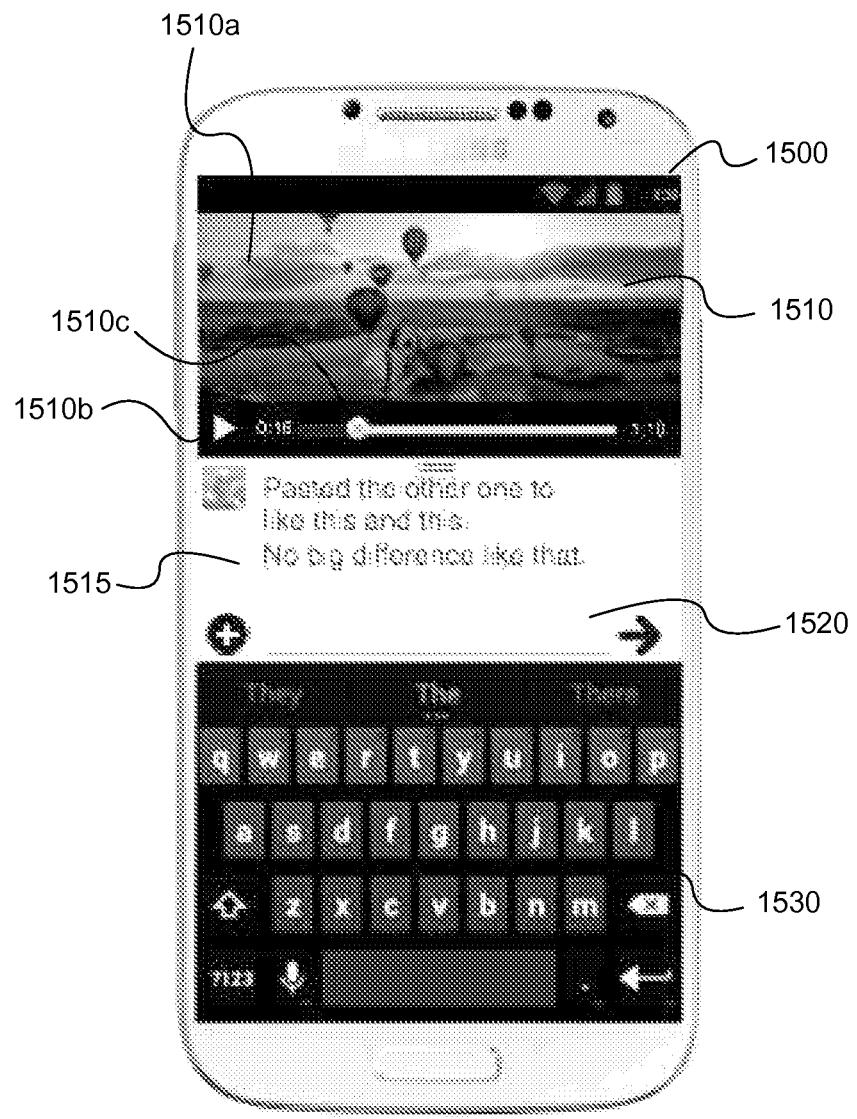
Figure 16:
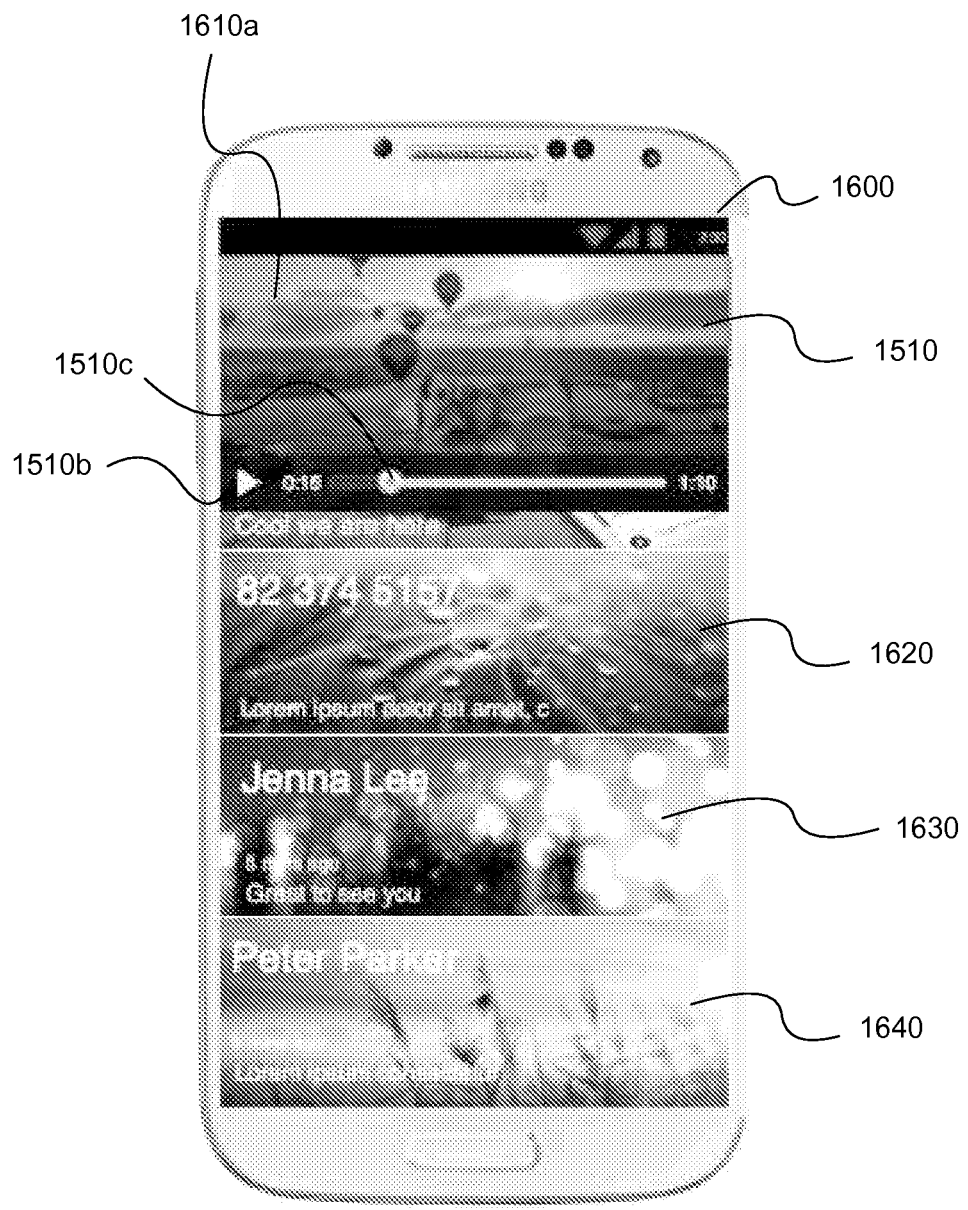

FIG. 14 is a screenshot 1400 showing interactive rich media 1420 and 1430, text message areas 1410, 1440, and 1450, and a text input area 1460. FIG. 15 is a screenshot 1500 showing interactive rich media 1510, a text message area 1515, and a text input area 1520. The area 1510 includes a display area 1510A showing a video, a play button 1510B and a slider 1510C for seeking to a random location in the video. The area 1530 contains a keyboard. FIG. 16 is a screenshot 1600 showing the area 1510 and blocks 1620, 1630, and 1640, with functionality similar to the blocks 1111-1114 in FIG. 11.

Figure 17:
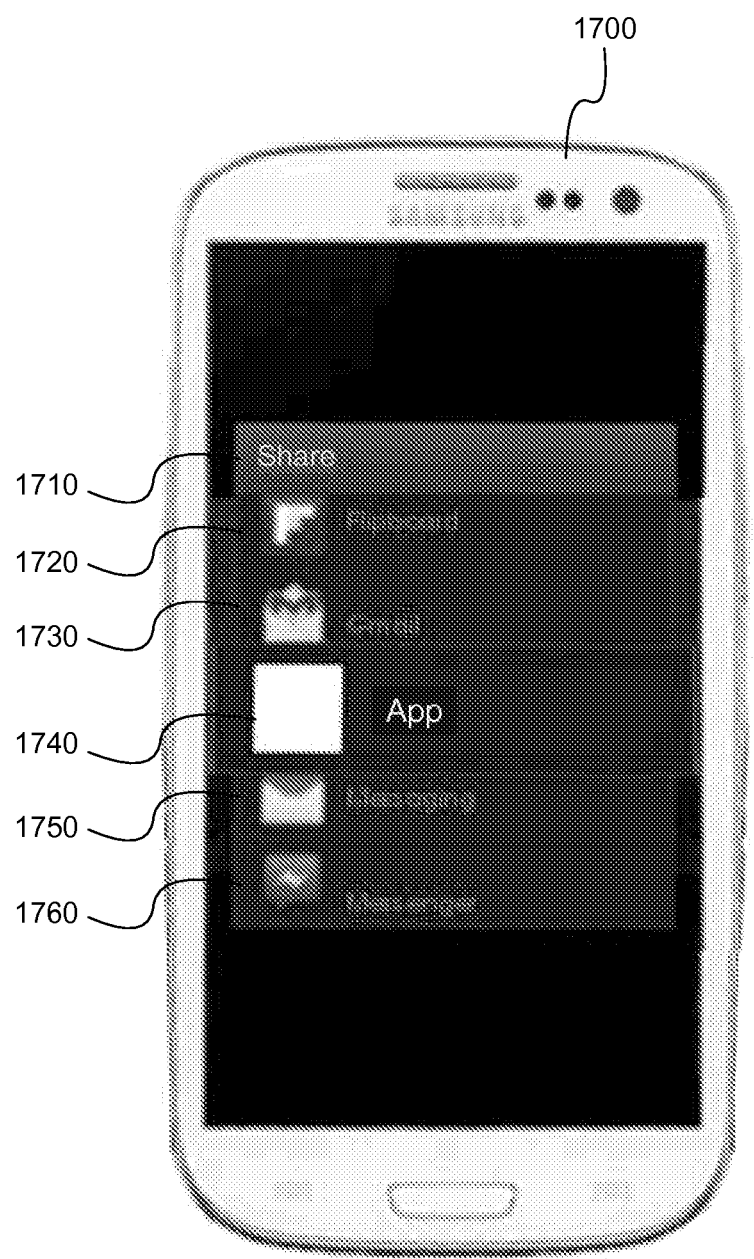
FIG. 17 is a screen shot of an interface for launching chat sessions in accordance with one embodiment of the invention.

FIG. 17 shows a screenshot 1700 of an interface for launching applications in accordance with the invention. The interface includes icons for launching Share 1710, Flipboard 1720, Gmail 1730, a texting application in accordance with one embodiment of the invention 1740, Messaging 1750, and Messenger 1760.

Adding Features to a Chat

In accordance with embodiments of the invention, a chat is customizable so that features can be added to it. In one embodiment, a chat session is customized so that rich media are shared between users during a chat session. As one example, a user is presented with a menu of rich media, applications, such as Facebook®, or promotional materials, such as coupons. Users can select these menu items during a chat session to share with others participating in the chat session. For a fee, content and service providers are able to have their content or services promoted in the menu. Higher-paying sponsors will have their content and services displayed more prominently, such as by being placed higher in the menu.

Figures 18A, 18B:
FIGS. 18A and 18B are screen shots illustrating ways to share rich media during a chat session in accordance with embodiments of the invention.

FIGS. 18A and 18B are screenshots illustrating two ways of sharing rich media in accordance with one embodiment of the invention. FIG. 18A is a screen shot of a menu (rich media) 1800 displayed after a user has selected the plus ("+") button within a chat session executing on a phone 1850. The menu 1800 contains sponsored items for Yelp® 1812, YouTube® 1813, Instagram® 1814, Google Chrome™ 1815, Google® maps 1816, Pinterest® 1817, and Spotify® 1818. When a user selects any of these menu items, the rich media is shared among users during the chat session.

In one embodiment, a widget embedded in the chat session is customized to generate the menu items in FIG. 18A by pressing the + button. Alternatively, the widget is customized to generate other menu items for sharing or to generate menu items by pressing a different button. Those skilled in the art will recognize other ways to add features in accordance with the principles of the invention.

FIG. 18B is a screenshot 1850 showing a second way to share rich media in accordance with one embodiment of the invention, directly from any application on the phone 1850. In the embodiment of FIG. 18B, a texting application in accordance with one embodiment of the invention is one of the applications to be shared.

Figure 19A:
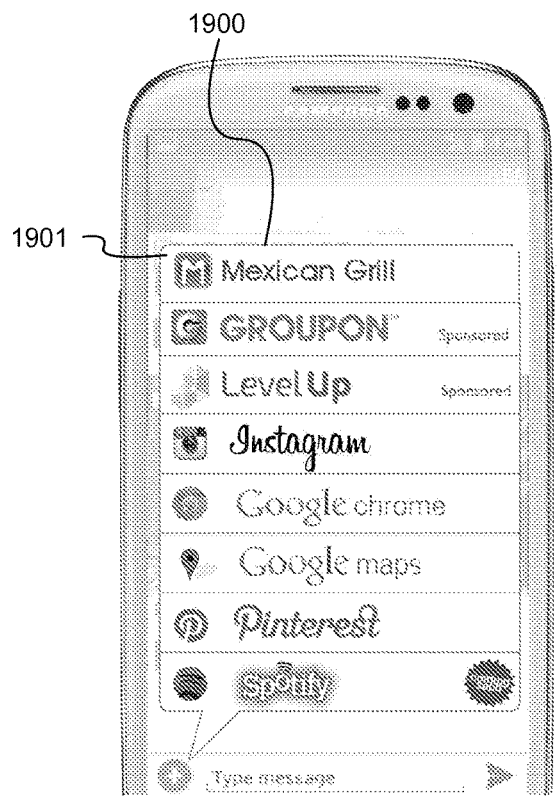
FIGS. 19A and 19B are screen shots illustrating ways to present services and products during chat sessions in accordance with embodiments of the invention.
Figure 19B:
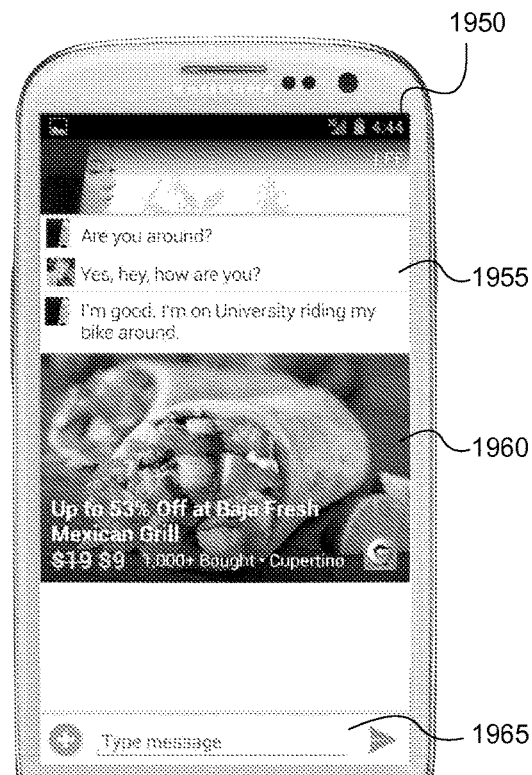

FIG. 19A is a screenshot 1900 in which the selections of rich media include coupons, such as one for Mexican Grill 1901. FIG. 19B is a screenshot on the device after the user has selected the option for Mexican Grill during a chat session. After the coupon has been selected during the chat session, the coupon is automatically embedded within the chat session, without the user leaving the chat session. The coupon can thus be shared with other users taking part in the chat session. The coupons and other promotional rich media can be stored in a variety of locations, such as on the host 420 in FIG. 4, and later downloaded into a texting application.

In other embodiments, a user gets a notification during a chat session that a recipient of rich media such as a video is watching the video. This notification can be triggered when the rich media begins executing on the recipient's device.

Virtual Friends

The principles of the invention can be extended to include other features. For example, a user can add one or more virtual friends to the texting application and later exchange messages with the virtual friends. Virtual friends can be categorized. As some examples, a user has a Major League Baseball (MLB) virtual friend "Chris" for baseball, a virtual friend "Sally" for movies, a virtual travel agent friend "Dani" for vacation traveling, a National Aeronautics and Space Administration (NASA) virtual friend "Ruth" for space travel, and a Sony representative virtual friend "Ben" for music, to name only a few such virtual friends. A user is able to chat with these virtual friends and receive information, including embedded rich media, but also non-embedded information.

The virtual friends are able to text and share content such as text, photographs, audio, and video. A user is able to text a question about major league baseball to Chris and the system (e.g., 420, FIG. 4), using, for example, artificial intelligence applications, generates an answer that is transmitted back to the user. Chris is able to send the user a real-time text message that the user's team just scored, a video of a scoring play that just occurred, rich content containing a "Buy" button for purchasing tickets to a game, or an interactive widget that the user is able to forward to another friend, to name only a few such things that Chris is able to do.

In one embodiment, virtual friends have a layer of virtual intelligence. The virtual friends have the intelligence to analyze a user's texting history (who or what he texted about), purchasing patterns, current events, and other information to determine what content may be of interest to the user. For example, if a user has bought baseball tickets when the Saint Louis Cardinals baseball team came to town, Chris is able to notify the user that the Cardinals are in town next week. Chris is also able to send rich content allowing the user to buy tickets to the game.

In other embodiments, virtual friends are able to answer questions that the user posed. For example, a user shopping for a CD for her 14-year-old nephew asks Ben (the Sony representative), "What is the most popular music for 14-year-old boy?" Ben responds with a list of musicians, rich media containing music clips, and a "Buy" button for CDs containing the music clips.

Preferably, virtual friends have different knowledge bases. Each virtual friend is connected to segmented content databases. Each database contains information in a specific category, allowing each virtual friend to "specialize" in a particular area. In one embodiment, the virtual friend applications and corresponding information databases are stored on one or more hosts such as the host 420 in FIG. 4.

Figure 20:
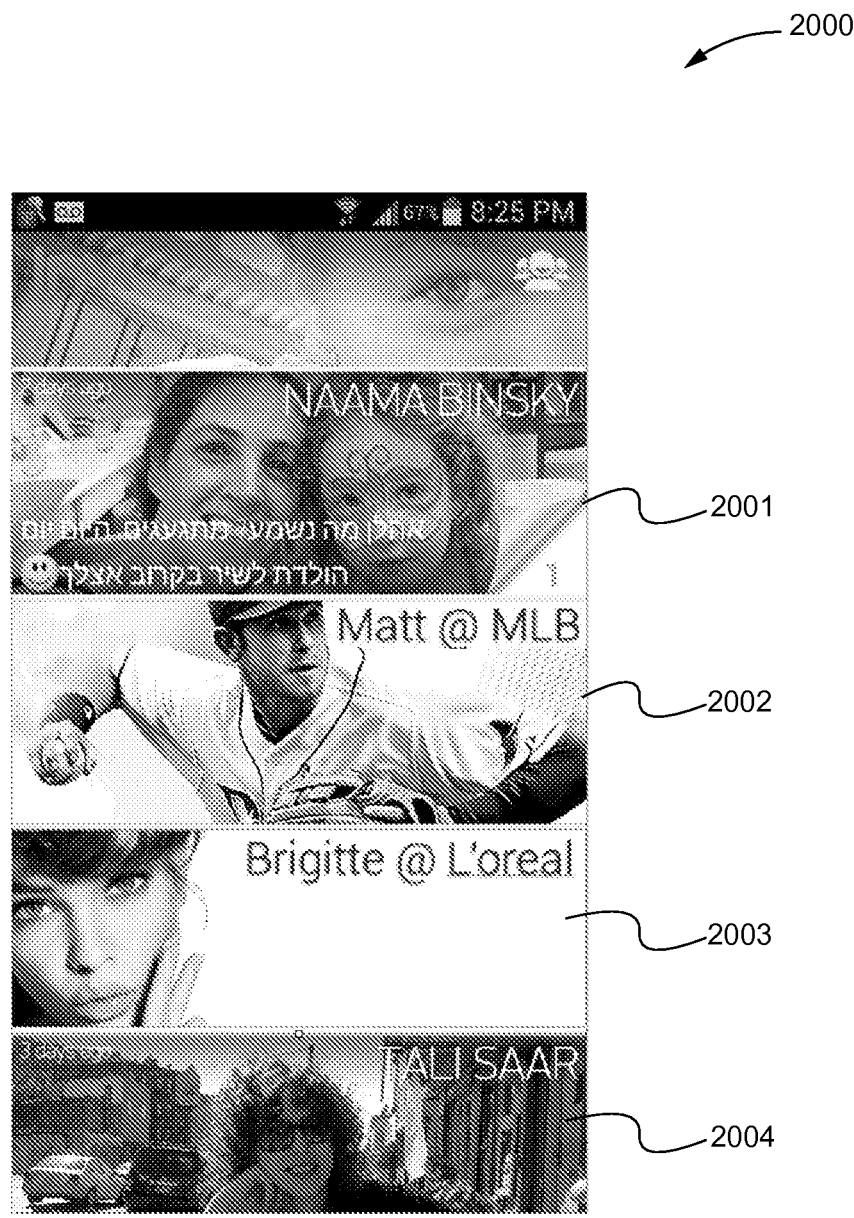
FIG. 20 is a screen shot showing, among other things, threads corresponding to virtual friends in accordance with one embodiment of the invention.

FIG. 20 is a screen shot 2000 showing, among other things, virtual friends Matt 2002, for Major League Baseball, and Brigitte 2003, for make-up. Chat sessions are able to be triggered with these virtual friends 2002 and 2003 and rich media embedded, such as described in the examples above. Virtual friends are able to be organized (e.g, listed in a particular order) by popularity.

In some embodiments, the location of the list of virtual friends are able to be sold or sponsored. A market of friends is able to be run, and the virtual friends are able to be added to the texting application. The system suggests a variety of virtual friends and creates a marketplace for users to create and suggest virtual friends to other users.

In other embodiments, the system determines friends that a user has texted most often or most recently and offers them invitations to register on the system.

In yet another embodiment, a virtual friends service is available by subscription. For example, a user pays a weekly, monthly, or yearly fee to access the service.

System Credit

In another embodiment, a system provides an environment for generating, using, and exchanging credit. For example, money is connected to a texting application. Users can buy credit for use on the system. Users are able to gain or win credit, which can be used to buy products or services on the system, including other applications that execute on the user's device, coffee at a local coffee shop, tickets on Fandango®, books on Amazon.com®, and products and services from Level App, Orderahead™, and Open Table®, to name a few examples. In addition, users are able to send each other credit or products and services that they bought with the credit. Users can use their credit to unlock features on their device, such as more elegant emoticons that can be embedded into their text messages.

Auto Suggestions (while Writing a Message)

In another embodiment of the invention, suggestions are automatically presented to a user typing a text message. A user typing a text message will receive suggestions in real time. Preferably, the text is automatically sent to a server (e.g., 420, FIG. 4), which analyzes the text and determines one or more recommendations to make. The user is then presented with cards or widgets of information to send to her friends. As one example, a user texts her friend about a new movie. The server determines relevant content and sends the user a visual card widget that contains information about the movie or information about a similar but better-rated movie, such as a trailer, show times, and a "Buy tickets" button. The user is able to send this visual card widget to her friend. The suggestion is able to be forwarded with a content-specific action bar, "Liked," posted on Facebook®, or otherwise shared as described in the above examples. Users are able to turn off this "suggestion" feature if they choose.

Hybrid Mode

When a user is viewing any rich media that his friend has sent to him (the friend's location, a video, a Web site, a photo, a game, etc.) within "hybrid mode," the rich media takes up only a part of the screen, allowing the user the ability to navigate to somewhere else in a texting application box in accordance with one embodiment of the invention (inbox, contacts list, another chat), while the rich media stays open for the user to view.

Ability to Quickly Share Rich Media that a User is Viewing Via Drag and Drop/Tap The user then is able to share the active rich media with someone else by dragging and dropping or by tapping a button. The user is able to drop or push the rich media into another existing chat in the inbox, select a contact in the contacts list, or drop it directly into an open chat. FIGS. 21A-D illustrate sharing rich media this way in accordance with embodiments of the invention.

Figure 21A:
FIGS. 21A-D are screenshots showing dragging and dropping rich media into a chat session in accordance with one embodiment of the invention.
Figure 21B:
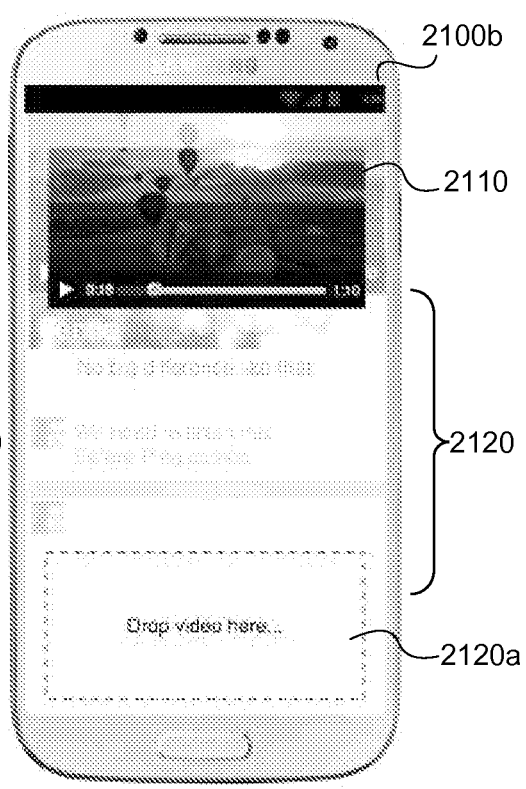
Figure 21C:
Figure 21D:
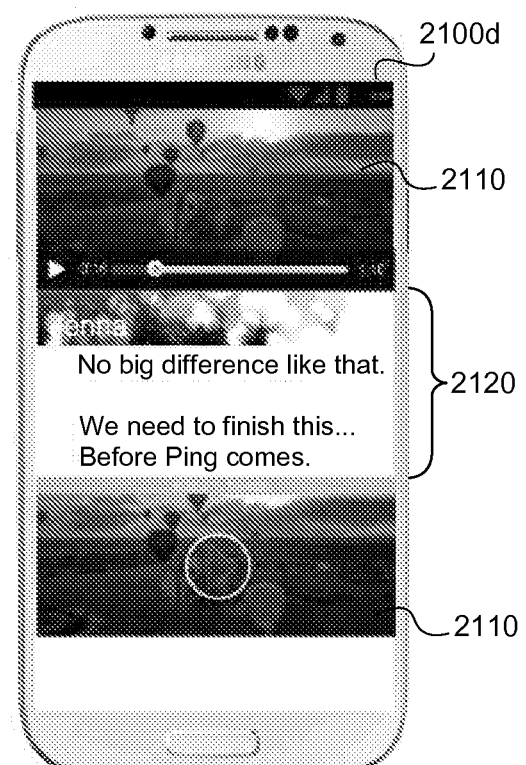

FIG. 21A is a screenshot 2100A showing rich media (a video) 2110 displayed during a chat session 2120. FIG. 21B is a screenshot 2100B of the same chat session, showing a destination 2120A within the chat session to move the video 2110. FIG. 21C is a screenshot 2100C during the same chat session after the video 2110 has been tapped, thereby sliding a panel 2110' over the video. FIG. 21D is a screenshot 2100D after the video 2110 has been dropped and dragged at the area 2120A.

Ability to Quickly Forward a Message/Media Via Drag and Drop

The user is able to long-press a message or any other content in the chat page. The message or piece of content becomes selected as long as the user does not leave it. The message or the content is able to be dragged around under the user's finger. If the content is moved towards the edges of the device screen, other screens of the application, such as the list of conversations, are revealed.

The user is able to drag an item above different drop-targets (e.g., a conversation). When content is dragged so that it hovers over a specific drop-target, that drop-target becomes selected. Raising a finger while such a drop-target is selected will trigger forwarding of the content to the selected drop-target.

Adding Gamification to Texting

In another aspect of the invention, gamification techniques are applied to texting. Recognition and benefits are given users depending on how active they are using the texting application. For example, a user gets credits, such as discussed above, based on the number of messages they sent using the system, the number of friends they have invited to the system, the number of YouTube® videos they shared using the system, the number of Facebook® postings they made, the number of friends to whom they forwarded information using the system, or any combination of these and other actions they took using a system in accordance with the invention.

As one example, after a user has exchanged 1,000 messages with a friend using a system in accordance with the invention, the user, the friend, or both are rewarded with a pleasing animation and accompanying video clip. As another example, a user who has shared a particular video clip with a pre-determined number of friends using the same system is rewarded with 20 credits for purchasing content, goods, and services, such as described above. A user is also able to purchase pre-paid credit. Users are able to use credit to purchase content and services related to systems in accordance with the present invention, such as fun applications, badges, animated cards, better emoticons. A user is able to purchase features on the system that were previously blocked to him. Users are also able to purchase content and services unrelated to these systems, such as e-cards for Starbucks Coffee® or new phones. Users can send and receive this credit instantly, such as in embedded content in a texting application described herein.

Texting API

In another aspect, an "open" application programming interface (API) is provided to users, allowing them to present their content to other users of systems in accordance with embodiments of the invention. The API allows users to determine what rich content is presented, how it is presented, and what actions are able to be taken on the content. As some examples, a user determines the content-specific action bar, allowing such actions as play, forward, zoom in, copy, "Post," and "Like," to name only a few such actions.

Figure 22:
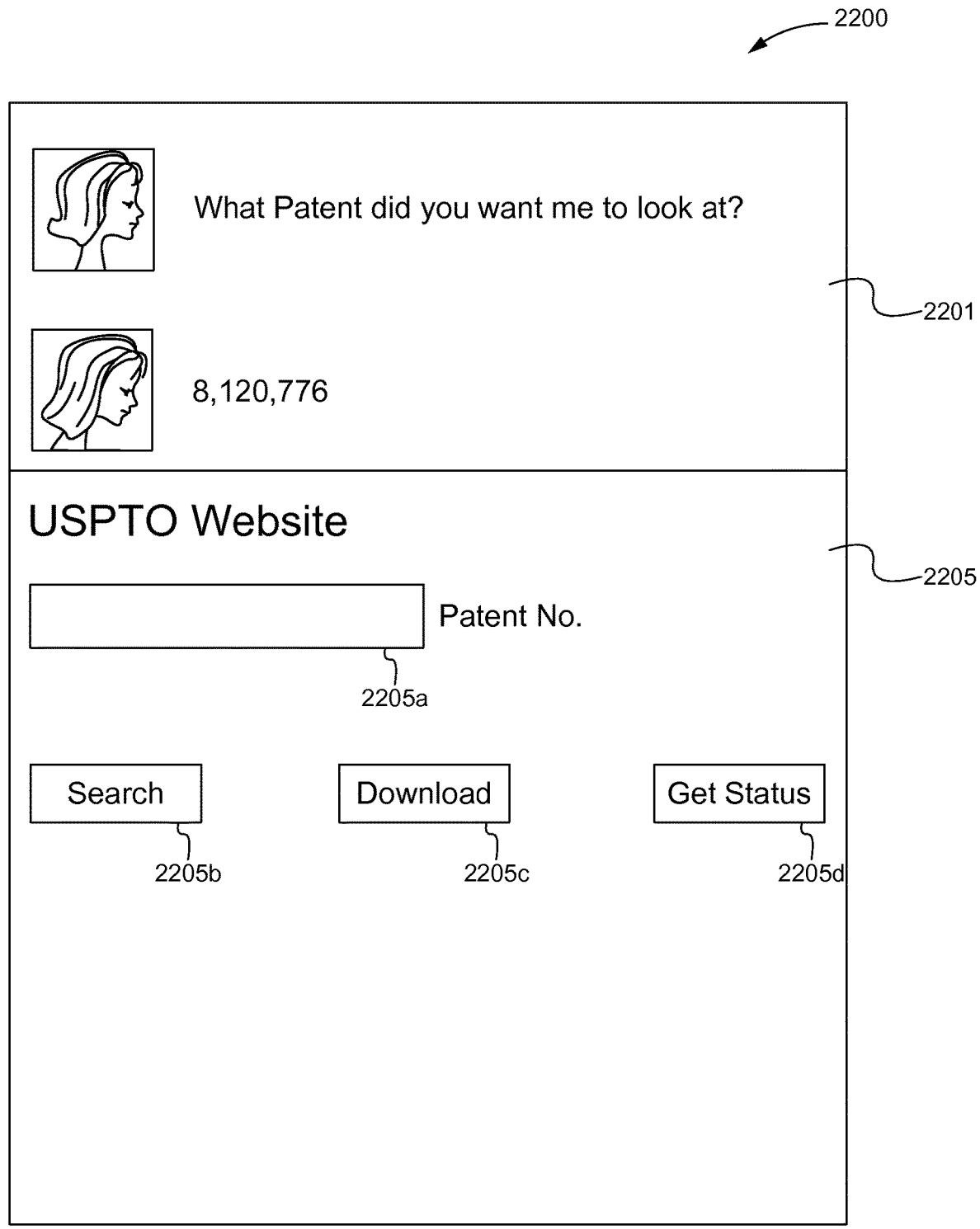
FIG. 22 is a screenshot showing an open API in accordance with one embodiment of the invention.

As one example, a user calls certain functions in the API to generate an action bar tailored to access the United States Patent and Trademark Office (USPTO) Web site. Once these functions are called through the API, a widget is generated, with an action bar that allows a user receiving the widget within a text message to search for issued patents and patent applications at the USPTO, download documents from the USPTO, and get the status of specified patent applications, to name only a few possible actions. FIG. 22 shows a screenshot 2200 illustrating this example. The screenshot 2200 shows a text area 2201 and a rich media 2205 that includes an input area 2205A for entering a patent numbers, a "Search" button 2205B, a "Download" button 2205C, and a "Get Status" button 2205D for performing associated functions in the USPTO Web site.

For any applications for which a particular API has not been provided, a generic API is able to be provided. The generic API is able, for example, to give a thumbnail image of a Web page.

In still other embodiments, when a link is copied and pasted, such as described above in FIG. 7, the link is automatically pasted as a shortened URL. This decreases the chances of a link "breaking," as often happens with longer links. In other embodiments, the screen is split into an application section and a chat section. Both the applications and the chats can be flipped. Chat logs are able to automatically be divided into conversations.

In operation, a texting application contains a widget used to embed rich media within the texting application. A user is able to watch and control the rich media directly within the texting application. The user is able to collapse the rich media to simultaneously view different rich media on his phone. He is able to activate the rich media and a chat session associated with each one. Preferably, the rich media has a context-specific action bar that allows the user to, among other things, expand, collapse, play, share, post, or forward the rich media. After sending rich media to a friend, the user is able to monitor his friend's viewing or listening position in the media, and he is able to sync his position to that of his friend's.

Different embodiments of the invention are directed to automatically sharing information, using, for example, robots and to automatically adding content such as cards and widgets; customizing work; tailoring content; and providing access to the system, such as through APIs.

In one embodiment, user devices (e.g., 401 and 410) and the server 420 each contains computer-readable media for performing the algorithms described herein and a processor for executing those algorithms.

It will be appreciated that the embodiments described above are illustrative only and can be modified in many ways in accordance with the principles of the invention. As one example, while some of the examples describe using smartphones, it will be appreciated that any device connected to the Internet can be used in accordance with the principles of the invention. For example, embodiments of the invention are also able to be used on any handheld device, mobile phones, personal computers, desktop computers, laptop computers, tablets, personal digital assistants, iPads®, smart watches, and smart glasses, such as Google® smart glasses, to name only a few such devices.

It will also be appreciated that the embodiments can be combined in many different ways to form systems with any combination of features discussed herein. For example, all of the features described herein are able to be included on a single device or distributed across multiple devices. It will be apparent to those skilled in the art that other various modifications may be made to the embodiments without departing from the spirit and scope of the invention as defined by the appended claims.

What is claimed is:

1. A computer-implemented method comprising:
adding, by a chat application on an electronic device of a first user, a categorized virtual friend as a virtual friend of the first user in the chat application;
sending a user query to a server;
accessing, by the categorized virtual friend, a texting history associated with the first user to a second user;
receiving, at the electronic device, a response message based on the texting history from the categorized virtual friend;
executing, by the electronic device, code to display an embedded widget that is embedded within the chat application, wherein the embedded widget includes a video related to the response message;
receiving user input to move a representation of the video into a conversation in a conversation portion of the chat application with one or more contacts of the first user;
responsive to receiving the user input, forwarding the video from the electronic device to a number of contacts that are part of the conversation;
responsive to the number of other users exceeding a pre-determined number, generating a credit to purchase content or services within the chat application; and
responsive to purchase of the content using the credit, enabling the first user to access a feature of the chat application that is unavailable prior to the purchase.

2. The method of claim 1, wherein the texting history includes purchasing patterns and current events .

3. The method of claim 2, wherein the categorized virtual friend is made available via a subscription service and further comprising:
receiving a payment via the chat application for the subscription service.

4. The method of claim 3, wherein the credit is further based on at least one selected from the group of exceeding a threshold number of sent messages using the chat application, exceeding a threshold number of friends invited to the chat application, exceeding a threshold number of posts made in the chat application, and exceeding a threshold number of pieces of content forwarded using the chat application.

5. The method of claim 1, wherein the user input to move the video includes a long-press of the video and a drag-and-drop motion to move the video into the conversation.

6. The method of claim 1, wherein the response message includes a link to the video and further comprising:
converting the link into the embedded widget with a context-sensitive action-bar with actions specific to the video.

7. The method of claim 1, wherein the chat application is a first chat application and further comprising:
sending, by the chat application, based on a request from the first user, the embedded widget to the second user associated with a second chat application, wherein the embedded widget includes the video.

8. A non-transitory computer-readable medium with instructions stored thereon that, when executed by a processor of an electronic device, cause the processor to perform operations, the operations comprising:
adding, by a chat application on the electronic device of a first user, a categorized virtual friend as a virtual friend of the first user in the chat application;
sending a user query to a server;
accessing, by the categorized virtual friend, a texting history associated with the first user to a second user;
receiving, at the electronic device, a response message based on the texting history from the categorized virtual friend;
executing by the electronic device, code to display an embedded widget that is embedded within the chat application, wherein the embedded widget includes a video related to the response message;
receiving user input to move a representation of the video into a conversation in a conversation portion of the chat application with one or more contacts of the first user;
responsive to receiving the user input, forwarding the video from the electronic device to a number of contacts that are part of the conversation;
responsive to the number of other users exceeding a pre-determined number, generating a credit to purchase content or services; and
responsive to purchase of the content using the credit, enabling the first user to access a feature of the chat application that is unavailable prior to the purchase.

9. The computer-readable medium of claim 8, wherein the texting history includes purchasing patterns and current events.

10. The computer-readable medium of claim 9, wherein the categorized virtual friend is made available via a subscription service and the operations further comprise
receiving a payment via the chat application for the subscription service.

11. The computer-readable medium of claim 10, wherein the credit is further based on at least one selected from the group of exceeding a threshold number of sent messages using the chat application, exceeding a threshold number of friends invited to the chat application, exceeding a threshold number of posts made in the chat application, and [[or]] exceeding a threshold number of pieces of content forwarded using the chat application.

12. The computer-readable medium of claim 8, wherein the purchase is for a product for another application that operates on the electronic device.

13. The computer-readable medium of claim 8, wherein the response message includes a link to the video and the operations further comprise:
converting the link into the embedded widget with a context-sensitive action-bar with actions specific to the video.

14. The computer-readable medium of claim 8, wherein the chat application is a first chat application and the operations further comprise:
sending, by the chat application, based on a request from the first user, the embedded widget to the second user associated with a second chat application, wherein the embedded widget includes the video.

15. An electronic device comprising:
one or more processors; and
a memory, coupled to the one or more processors, that stores instructions that, when executed by the one or more processors cause the one or more processors to perform operations comprising:

adding, by a chat application on the electronic device of a first user, a categorized virtual friend as a virtual friend of the first user in the chat application;

sending a user query to a server;

accessing, by the categorized virtual friend, a texting history associated with the first user to a second user;

receiving, at the electronic device, a response message from the server;

executing by the electronic device, code to display an embedded widget that is embedded within the chat application, wherein the embedded widget includes a video related to the response message;

receiving user input to move a representation of the video into a conversation in a conversation portion of the chat application with one or more contacts of the first user;

responsive to receiving the user input, forwarding the video from the electronic device to a number of contacts that are part of the conversation;

responsive to the number of other users exceeding a pre-determined number, generating a credit to purchase content or services within the chat application; and responsive to purchase of the content using the credit, enabling the first user to access a feature of the chat application that is unavailable prior to the purchase.

16. The electronic device of claim 15, wherein the texting history includes purchasing patterns and current events.

17. The electronic device of claim 16, wherein the categorized virtual friend is made available via a subscription service and the operations further comprise:

receiving a payment via the chat application for the subscription service.

18. The electronic device of claim 17, wherein the credit is further based on at least one selected from the group of exceeding a threshold number of sent messages using the chat application, exceeding a threshold number of friends invited to the chat application, exceeding a threshold number of posts made in the chat application, and exceeding a threshold number of pieces of content forwarded using the chat application.

19. The electronic device of claim 15, wherein the credit is for a badge or an animated card.

20. The electronic device of claim 15, wherein the response message includes a link to the video and the operations further comprise:

converting the link into the embedded widget with a context-sensitive action-bar with actions specific to the video.

* * * * *

UNITED STATES PATENT AND TRADEMARK OFFICE
CERTIFICATE OF CORRECTION

| | |
|---|---|
| PATENT NO. | : 11,595,339 B2 |
| APPLICATION NO. | : 16/721586 |
| DATED | : February 28, 2023 |
| INVENTOR(S) | : Tal et al. |

It is certified that error appears in the above-identified patent and that said Letters Patent is hereby corrected as shown below:

In the Claims

In Column 14, Line 43, please delete "and [[or]]" and insert -- and -- therefor.

Signed and Sealed this
Thirtieth Day of May, 2023

Katherine Kelly Vidal
*Director of the United States Patent and Trademark Office*